(12) United States Patent
Doiron

(10) Patent No.: US 6,619,312 B2
(45) Date of Patent: Sep. 16, 2003

(54) FLOW CONTROL MECHANISM FOR AN EAVES TROUGH DOWNSPOUT

(76) Inventor: Gaston Doiron, 1155 - 35A Street, Edmonton, Alberta (CA), T6L 2L4

(*) Notice: Subject to any disclaimer, the term of this patent is extended or adjusted under 35 U.S.C. 154(b) by 95 days.

(21) Appl. No.: 10/011,013

(22) Filed: Nov. 5, 2001

(65) Prior Publication Data

US 2002/0056475 A1 May 16, 2002

(30) Foreign Application Priority Data

Nov. 10, 2000 (CA) .............................................. 2325728

(51) Int. Cl.⁷ ............................ G05D 9/02; F16K 31/24
(52) U.S. Cl. ...................... 137/122; 137/357; 137/429; 52/16
(58) Field of Search ................................ 137/122, 357, 137/429; 52/16

(56) References Cited

U.S. PATENT DOCUMENTS

| | | |
|---|---|---|
| 264,393 A | 9/1882 | Wilson |
| 397,416 A | 2/1889 | Cawthorne |
| 406,877 A | 7/1889 | Clark et al. |
| 649,838 A | 5/1900 | Harry |
| 659,541 A | 10/1900 | Martin |
| 726,063 A | 4/1903 | Hummel |
| 914,936 A | 3/1909 | Estes |
| 925,053 A | 6/1909 | Sturgis |
| 1,006,138 A | 10/1911 | Shelby |
| 1,127,500 A | 2/1915 | Overmiller |
| 1,490,431 A | 4/1924 | Pendergraft |
| 2,030,467 A * | 2/1936 | Pearce .......................... 137/873 |
| 2,292,764 A | 8/1942 | Levering ........................ 137/9 |
| 3,990,474 A | 11/1976 | Harms .......................... 137/611 |
| 4,182,376 A | 1/1980 | Nilsson ........................ 137/874 |
| 4,428,394 A | 1/1984 | Wright ......................... 137/122 |
| 4,726,151 A | 2/1988 | Vitale ............................ 52/16 |
| 5,490,538 A | 2/1996 | Marcel et al. ............... 137/357 |
| 5,709,051 A * | 1/1998 | Mazziotti ........................ 52/16 |
| 5,730,179 A | 3/1998 | Taylor ......................... 137/357 |
| 5,836,116 A | 11/1998 | Widmann .................. 52/169.7 |
| 5,863,151 A | 1/1999 | Chapotelle ................... 405/52 |

* cited by examiner

*Primary Examiner*—Stephen M. Hepperle
(74) *Attorney, Agent, or Firm*—Davis & Bujold PLLC

(57) ABSTRACT

A flow control mechanism for an eaves trough downspout has a primary flow path through a housing from an inlet to a first outlet. A tubular arm extends from the housing and has a first end is in fluid communication with a second outlet. A deflector is pivotally secured within the housing for movement between a deflecting position and an inoperative position. In the deflecting position, the deflector deflects a liquid stream flowing along the primary flow path to a secondary flow path through the second outlet. A linkage extends through the tubular arm. A float is positioned at the second end of the tubular arm and suspended from a second end of the linkage. Movement of the deflector between the deflecting position and the inoperative position is tied by the linkage to the position of the float.

7 Claims, 2 Drawing Sheets

FLOW CONTROL MECHANISM FOR AN EAVES TROUGH DOWNSPOUT

FIELD OF THE INVENTION

The present invention relates to a flow control mechanism for an eaves trough downspout.

BACKGROUND OF THE INVENTION

There are many persons who chose to capture rain water. They do this by directing their eaves trough downspout into a rain barrel. It is undesirable to permit uncontrolled overflow of rainwater from the rain barrel, as such an overflow next to a basement of a house can potentially lead to the basement flooding.

Persons collecting rain water are rarely available to closely monitor the quantity of rain accumulating in their rain barrels. For this reason flow control mechanism for eaves trough downspouts have been developed. An example of such a flow control mechanism is U.S. Pat. No. 4,428,394 which issued to Wright in 1984. The Wright patent discloses a deflector baffle positioned in a section of downspout which can be positioned to either deflect water flowing through the downspout into a rain barrel or into a conduit leading elsewhere. The position of the deflector is determined by an associated float mechanism that extends into the rain barrel.

A disadvantage of the Wright patent is that in order for the float to function, the rain barrel must be positioned immediately adjacent to the eaves trough downspout.

SUMMARY OF THE INVENTION

What is required is a flow control mechanism for an eaves trough downspout that will give more flexibility on rain barrel positioning.

According to the present invention there is provided a flow control mechanism for an eaves trough downspout which includes a housing having an inlet, a first outlet, and a second outlet. A primary flow path is provided through the housing being provided between the inlet and one of the first outlet and the second outlet. A tubular arm extends from the housing. The arm has a first end and a second end. The first end is in fluid communication with the second outlet. A deflector is pivotally secured within the housing for movement between a deflecting position and an inoperative position. In the deflecting position, the deflector is adapted to deflect a liquid stream flowing along the primary flow path to a secondary flow path through the other of the first outlet and the second outlet. In the inoperative position, the deflector is spaced from the primary flow path. A linkage extends through the tubular arm. The linkage has a first end and a second end. The first end of the linkage is secured to the deflector. A float is positioned at the second end of the tubular arm and suspended from the second end of the linkage. Movement of the deflector between the deflecting position and the inoperative position is tied by the linkage to the position of the float.

The flow control mechanism, as defined above, enables a rain barrel to be positioned at a distance from the downspout. This is made possible by the linkage that extends through the arm. This feature enables the rain barrel to be positioned on an edge of the garden or wherever may be most convenient for the user. There is no need to change the basic downspout configuration, as the described flow control mechanism can be inserted into a section of the existing downspout. Unlike the Wright flow control mechanism, the rain barrel does not have to be uncovered for the mechanism to work. This enables the rain barrel to be fitted with a lid to keep out debris.

Although beneficial results may be obtained through the use of the flow control mechanism, as described above, it is undesirable for debris from the roof to be deposited into the rain barrel. Even more beneficial results may, therefore, be obtained when a debris screen is positioned at an angle across the primary flow path upstream of the deflector to deflect debris in liquids flowing along the flow path to a tertiary flow path leading to the first outlet. This additional features prevents most debris from passing through the second outlet.

Other additional features which improve the operation of the flow control mechanism, will hereafter be described in relation to the structure and operation of the flow control mechanism.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
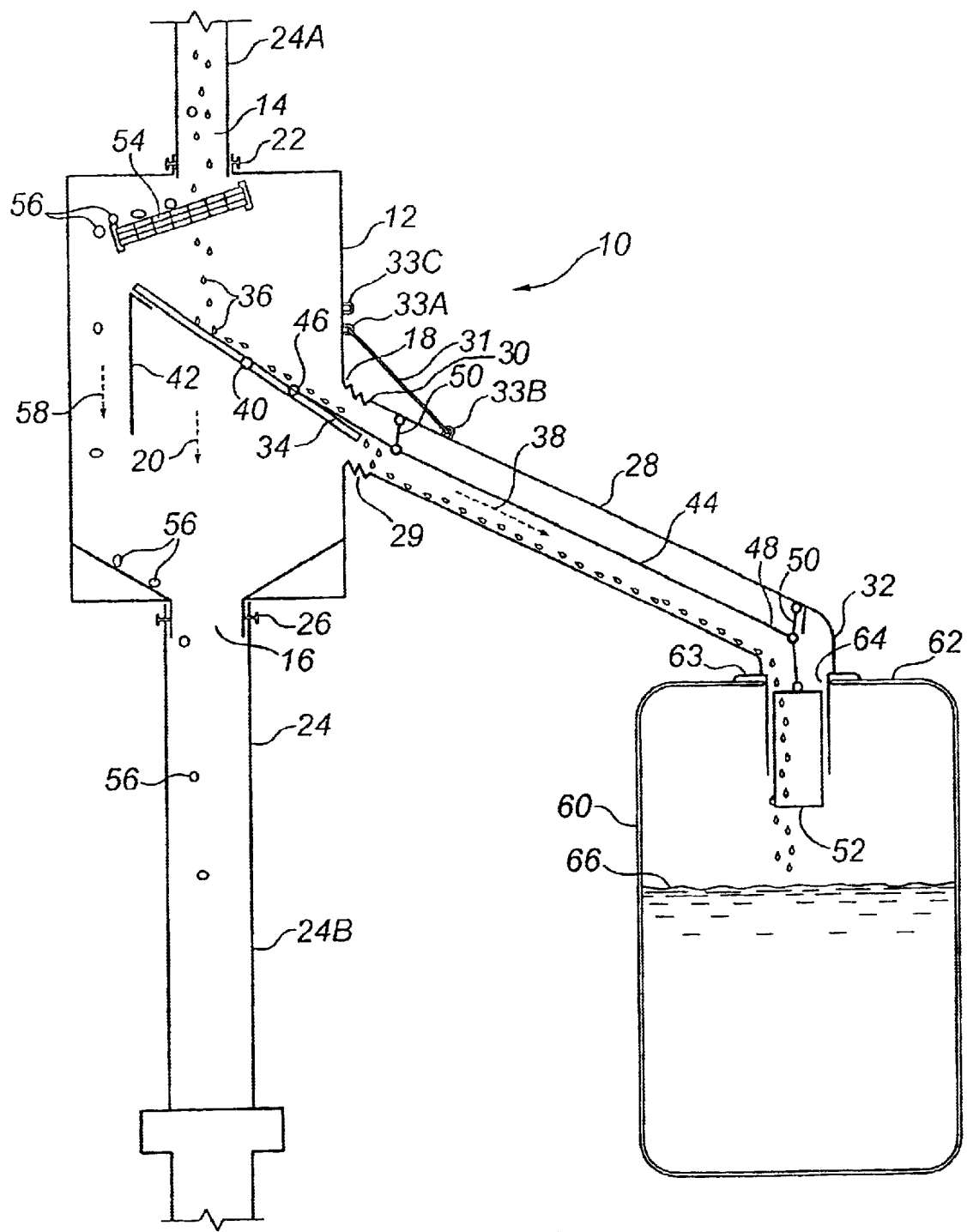
FIG. 1 is a side elevation view, in section of a flow control mechanism for an eaves trough downspout constructed in accordance with the teachings of the present invention, with its deflector in a deflecting position.

The preferred embodiment, a flow control mechanism for an eaves trough downspout generally identified by reference numeral 10, will now be described with reference to FIGS. 1 and 2.

Figure 2:
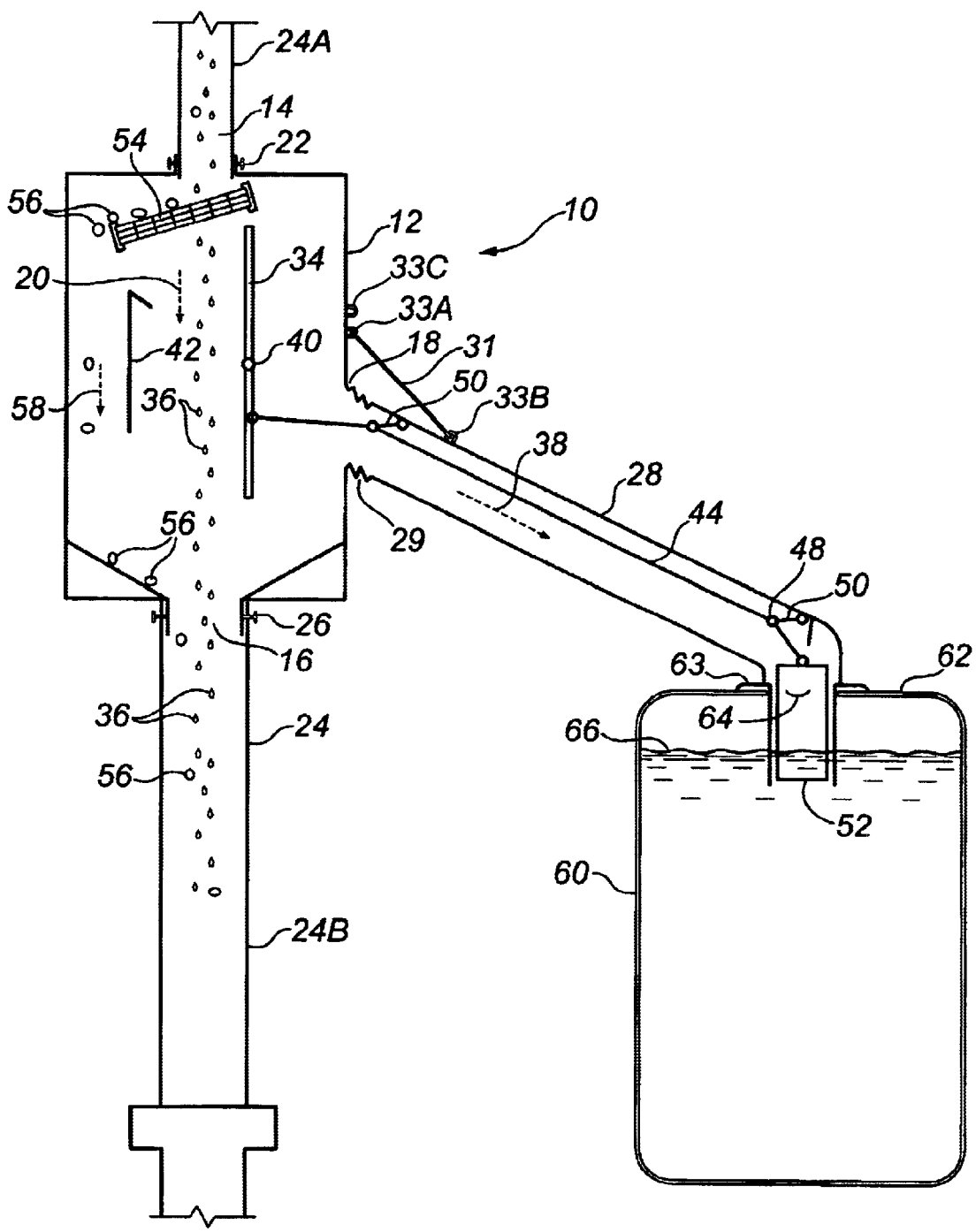
FIG. 2 is a side elevation view, in section of the flow control mechanism illustrated in FIG. 1, with its deflector in an inoperative position.

Structure and Relationship of Parts:

Referring to FIG. 1, flow control mechanism 10 includes a housing 12 that has an inlet 14, a first outlet 16, and a second outlet 18. A primary flow path 20 is provided through housing 12 between inlet 14 and first outlet 16 as indicated by arrow 20. A first coupling 22 is provided for coupling inlet 14 to an upper section 24A of eaves trough downspout 24. A second coupling 26 is provided for coupling first outlet 16 to a lower section 24B of eaves trough downspout 24.

A tubular arm 28 extends from housing 12. Tubular arm 28 has a first end 30 and a second end 32. Tubular arm 28 has a flange 63 positioned adjacent second end 32. Tubular arm 28 has a corrugated portion 29 at first end 30. Corrugated portion 29 provides flexibility so that tubular arm 28 can be lifted enough to facilitate insertion and removal of tubular arm 28 in an opening 64 in a lid 62 of a rain barrel 60. A support line 31 is provided that extends from a first anchoring member 33A positioned on housing 12 to a second anchoring member 33B on tubular arm 28 so as to support tubular arm 28 in such a manner that tubular arm 28 won't fall as a result of the flexibility of corrugated portion 29. When tubular arm 28 is to be raised to accommodate removal of rain barrel 60, support line 31 can be disengaged from first anchor member 33A and engaged to a third anchor member 33C positioned on housing 12 above first anchor member 33A. This enables tubular arm 28 to be maintained in a slightly raised position while rain barrel 60 is properly positioned. When rain barrel 60 is properly positioned, support line 31 is disengaged from third anchoring member 33C, tubular arm 28 is lowered to the appropriate position, and support line 31 is again engaged to first anchor member 33A. Corrugated portion 29 at first end 30 of tubular arm 28 is in fluid communication with second outlet 18. A deflector 34 is pivotally secured within housing 12 for movement between a deflecting position, as illustrated in FIG. 1, and an inoperative position, as illustrated in FIG. 2. Referring to FIG. 1, in the deflecting position, deflector 34 is adapted to deflect a liquid stream 36 flowing along primary flow path 20 to a secondary flow path through second outlet 18, indicated by arrow 38. Referring to FIG. 2, in the inoperative position, deflector 34 is spaced from primary flow path 20. Referring to FIG. 1, deflector 34 has an eccentrically positioned pivot axis 40 that biases deflector 34 into the deflecting position. The flow of water along primary flow path 20 striking deflector 34, tends to maintain deflector 34 in the deflecting position. A support 42 is secured within housing 12 to support deflector 34 when in the deflecting position. A rigid linkage 44 extends through tubular arm 28. Linkage 44 has a first end 46 and a second end 48. First end 46 of linkage 44 is secured to deflector 34. Linkage guides 50 are positioned within tubular arm 28, so as to support and guide movement of linkage 44. A float 52 is positioned at second end 32 of tubular arm 28 and is suspended from second end 48 of linkage 44, such that movement of deflector 34 between the deflecting position as illustrated in FIG. 1, and the inoperative position as illustrated in FIG. 2, is tied by linkage 44 to the position of float 52. A debris screen 54 is positioned at an angle across primary flow path 20 upstream of deflector 34, to deflect debris 56 carried by water 36 flowing along primary flow path 20 to a tertiary flow path leading to first outlet 16, as indicated by arrow 58. This prevents debris from being deflected by deflector 34 and passing through second outlet 18.

Operation:

The use and operation of flow control mechanism 10 will now be described with reference to FIGS. 1 through 2. Referring to FIG. 1, flow control mechanism 10, as defined above, enables a collection container 60 such as a rain barrel to be positioned at a distance from eaves trough downspout 24. The ability to position rain barrel 60 at a distance from eaves trough downspout 24 is made possible by linkage 44 that extends through tubular arm 28. Movement of deflector 34 between the deflecting position as illustrated in FIG. 1, and the inoperative position as illustrated in FIG. 2, is tied by linkage 44 to the position of float 52. Linkage 44 allows for float 52 to function with deflector 34 so as to prevent an overflow despite rain barrel 60 being placed at a distance from eaves trough downspout 24.

Referring to FIG. 1, in the illustrated embodiment, rain barrel 60 has a lid 62 with an opening 64. Float 52 is suspended from linkage 44 through opening 64 in lid 62. Flange 63 positioned adjacent second end 32 of tubular arm 28 rests upon lid 62. Flange 63 prevents dirt and other debris from entering rain barrel 60 through opening 64 in lid 62. When liquid level 66 in rain barrel 60 is low, float 52 is suspended above liquid level 66. The weight of float 52 in conjunction with gravity, pulls linkage 44 which in turn moves deflector 34 into the deflecting position. When in the deflecting position, water 36 entering flow control mechanism 10 though inlet 14 is directed by deflector 34 toward second outlet 18 along secondary flow path 38 through tubular arm 28 and into rain barrel 60. As water 36 flows into rain barrel 60, liquid level 66 rises in rain barrel 60. When liquid level 66 reaches float 52, float 52 then rises with liquid level 66 thereby pushing up on linkage 44. Referring to FIG. 2, when float 52 pushes on linkage 44, linkage 44 moves deflector 34 to the inoperative position. With deflector 34 in the inoperative position, water 36 flows directly along primary flow path 20 into eaves trough downspout 24, bypassing rain barrel 60. Referring to FIG. 1, if liquid level 66 is lowered in rain barrel 60 by more than a preset amount, deflector 34 is moved to the deflecting position by downward movement of float 52 and water 36 is permitted to flow along tubular arm 28 and into rain barrel 60 again. Float can be made adjustable by means of a screw style of adjustment in the same fashion as is commonly used with a toilet float.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A flow control mechanism for an eaves trough downspout, comprising:
   a housing having an inlet, a first outlet, and a second outlet, a primary flow path through the housing being provided between the inlet and one of the first outlet and the second outlet;
   a tubular arm extending from the housing, the arm having a first end and a second end, the first end being in fluid communication with the second outlet;
   a deflector pivotally secured within the housing for movement between a deflecting position and an inoperative position, in the deflecting position the deflector being adapted to deflect a liquid stream flowing along the primary flow path to a secondary flow path through the other of the first outlet and the second outlet, in the inoperative position the deflector being spaced from the primary flow path;
   a linkage extending through the tubular arm, the linkage having a first end and a second end, the first end of the linkage being secured to the deflector; and
   a float positioned at the second end of the tubular arm and suspended from the second end of the linkage, such that movement of the deflector between the deflecting position and the inoperative position is tied by the linkage to the position of the float.

2. The flow control mechanism as defined in claim 1, wherein a debris screen is positioned at an angle across the primary flow path upstream of the deflector to deflect debris in liquids flowing along the flow path to a tertiary flow path leading to the first outlet, thereby preventing debris from passing through the second outlet.

3. The flow control mechanism as defined in claim 1, wherein a support is provided within the housing to support the deflector when in the deflecting position.

4. The flow control mechanism as defined in claim 1, wherein the deflector has an eccentrically positioned pivot axis biasing the deflector into the deflecting position.

5. The flow control mechanism as defined in claim 1, wherein linkage guides are provided within the arm.

6. The flow control mechanism as defined in claim 1, wherein the linkage is rigid.

7. A flow control mechanism for an eaves trough downspout, comprising:

a housing having an inlet, a first outlet, and a second outlet, a primary flow path through the housing being provided between the inlet the first outlet;

a first coupling for coupling the inlet to an eaves trough downspout;

a second coupling for coupling the first outlet to an eaves trough downspout;

a tubular arm extending from the housing, the arm having a first end and a second end, the first end being in fluid communication with the second outlet;

a deflector pivotally secured within the housing for movement between a deflecting position and an inoperative position, in the deflecting position the deflector being adapted to deflect a liquid stream flowing along the primary flow path to a secondary flow path through the second outlet, in the inoperative position the deflector being spaced from the primary flow path, the deflector having an eccentrically positioned pivot axis biasing the deflector into the deflecting position;

a support secured within the housing to support the deflector when in the deflecting position;

a rigid linkage extending through the tubular arm, the linkage having a first end and a second end, the first end of the linkage being secured to the deflector;

linkage guides being positioned within the arm, thereby supporting and guiding movement of the linkage;

a float positioned at the second end of the tubular arm and suspended from the second end of the linkage, such that movement of the deflector between the deflecting position and the inoperative position is tied by the linkage to the position of the float;

a debris screen positioned at an angle across the primary flow path upstream of the deflector to deflect debris in liquids flowing along the primary flow path to a tertiary flow path leading to the first outlet, thereby preventing debris from passing through the second outlet.

* * * * *